US010126729B2

(12) United States Patent
Bretschneider et al.

(10) Patent No.: US 10,126,729 B2
(45) Date of Patent: Nov. 13, 2018

(54) POSITION CONTROL OF MACHINE AXES WITH COLLISION AVOIDANCE AND ADAPTION OF A MACHINE MODEL TO A REAL MACHINE

(71) Applicant: Siemens Aktiengesellschaft, München (DE)

(72) Inventors: Jochen Bretschneider, Esslingen (DE); Jens Stefan Ciesielski, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 1027 days.

(21) Appl. No.: 14/498,038

(22) Filed: Sep. 26, 2014

(65) Prior Publication Data

US 2015/0094848 A1    Apr. 2, 2015

(30) Foreign Application Priority Data

Sep. 27, 2013    (EP) .................................. 13186420

(51) Int. Cl.
*G06F 19/00*    (2018.01)
*G05B 19/19*    (2006.01)
*B25J 9/16*    (2006.01)

(52) U.S. Cl.
CPC ............ *G05B 19/19* (2013.01); *B25J 9/1666* (2013.01); *B25J 9/1671* (2013.01); *G05B 2219/40476* (2013.01); *G05B 2219/50174* (2013.01)

(58) Field of Classification Search
CPC ........................................................ G06F 8/61
(Continued)

(56) References Cited

U.S. PATENT DOCUMENTS 5,808,893 A * 9/1998 Pugh .................... B23G 1/04
29/38 B
6,167,325 A * 12/2000 Kamiguchi ........ G05B 19/4103
700/164
(Continued)

FOREIGN PATENT DOCUMENTS

CN    101802734 A    8/2010
CN    102749886 A    10/2012
(Continued)

OTHER PUBLICATIONS

Roos E. et al; "Off-line programming of industrial robots—Adaptation of simulated user programs to the real environment"; Computers in Industry, Elsevier Science Publishers, Amsterdam; Bd, 33; Nr. 1; pp. 139-150; ISSN: 0166-3615: DOI: 10.1016/S0166-3615(97)00018-3; XP004096560; 1997; Aug. 1, 1997 (2014Q05247).
(Continued)

*Primary Examiner* — Evral E Bodden
(74) *Attorney, Agent, or Firm* — Henry M. Feiereisen LLC (57) ABSTRACT

A control device of a machine with a plurality of position-controlled axes controls the position-controlled axes in accordance with a part program while processing a system program. Through the control of the position-controlled axes, an end effector is moved along a track defined by the part program via at least one intermediate element relative to a base body of the machine under position control. While processing the system program, the control device checks before control of the position-controlled axes with a parameterizable model of the machine, whether the end effector can move along the track without collisions. Before checking the part program, the control device receives initial measured values characteristic of an actual configuration of the machine, determines parameters of the model based on
(Continued)

the initial measured values and parameterizes the model in accordance with the determined parameters.

17 Claims, 9 Drawing Sheets

(58) Field of Classification Search
USPC .......................................................... 700/186
See application file for complete search history.

(56) References Cited

U.S. PATENT DOCUMENTS

| | | | |
|---|---|---|---|
| 6,317,646 B1 * | 11/2001 | de Caussin | G05B 19/40937 700/173 |
| 6,920,370 B2 * | 7/2005 | Wehrli | B23Q 17/22 700/177 |
| 8,136,432 B2 * | 3/2012 | Travez | B23Q 15/12 700/159 |
| 8,700,639 B1 * | 4/2014 | Datar | G06F 17/30528 707/708 |
| 9,069,347 B2 * | 6/2015 | Kettemer | G05B 19/4061 |
| 2001/0012973 A1 | 8/2001 | Wehrli et al. | |
| 2009/0102410 A1 | 4/2009 | Bretschneider | |
| 2009/0164038 A1 | 6/2009 | Bretschneider | |
| 2009/0222306 A1 | 9/2009 | Bretschneider | |
| 2010/0138018 A1 | 6/2010 | Bretschneider | |
| 2011/0316335 A1 | 12/2011 | Bretschneider | |
| 2012/0123590 A1 | 5/2012 | Halsmer | |
| 2013/0103180 A1 * | 4/2013 | Tolkmitt | G05B 15/02 700/114 |
| 2014/0156052 A1 * | 6/2014 | Nishibashi | G05B 19/4103 700/112 |
| 2015/0073579 A1 * | 3/2015 | Dick | B23D 45/14 700/114 |

FOREIGN PATENT DOCUMENTS

| | | |
|---|---|---|
| WO | WO 2006007833 A1 | 1/2006 |
| WO | WO 2008025577 A1 | 3/2008 |

OTHER PUBLICATIONS

Jochen Bretschneider, U.S. Pat. No. 7,570,006, Aug. 4, 2009, 2007-0225834, Sep. 27, 2007.

Jochen Bretschneider, U.S. Pat. No. 7,988,606, Aug. 2, 2011, 2010-0167888, Jul. 1, 2010.

Jochen Bretschneider, U.S. Pat. No. 8,322,698, Dec. 4, 2012, 2010/0164156, Jul. 1, 2010.

* cited by examiner

POSITION CONTROL OF MACHINE AXES WITH COLLISION AVOIDANCE AND ADAPTION OF A MACHINE MODEL TO A REAL MACHINE

CROSS-REFERENCES TO RELATED APPLICATIONS

This application claims the priority of European Patent Application, Serial No. 13186420.9, filed Sep. 27, 2013, pursuant to 35 U.S.C. 119(a)-(d), the content of which is incorporated herein by reference in its entirety as if fully set forth herein.

BACKGROUND OF THE INVENTION

The present invention relates to a method of operation for a machine with a plurality of position-controlled axes, a system program, wherein the system program for operating the machine according to such method, a control device for a machine having a plurality of position-controlled axes, and a machine having a plurality of position-controlled axes controlled by the control device.

The following discussion of related art is provided to assist the reader in understanding the advantages of the invention, and is not to be construed as an admission that this related art is prior art to this invention.

Part programs for machines with a plurality of position-controlled axes are often created using, programming tools. As part of the creation of the part programs, the part programs are usually checked for absence of collisions. For this purpose processing of the part program is simulated by a computing device. As part of the simulated processing a check is made, by means of a model of the machine, as to whether the movement of the end effector along the track defined by the part program is possible without collisions. The model of the machine is often able to be parameterized. In this case the model of the machine is parameterized such that the correspondingly parameterized model emulates the machine as well as possible. In particular the corresponding parameters are predetermined manually to the computing device by an operator of the computing device.

The computing device is a separate device from the control device of the machine. If the simulation produces a collision the part program is changed. If the simulation does not produce a collision the part program is transferred to the control device and is executed there.

Transfer of the modeling of the machine to the control device is also known. In this case the control device checks—as an alternative or in addition to the check by means of the computing device—by means of the parameterizable model of the machine while processing the system program before the control of the position-controlled axes, whether the movement of the end effector along the track as defined by the part program is possible without collisions.

Despite the checking of the part program by means of the computing device and/or the control device beforehand, collisions still occur sometimes in the prior art.

It would therefore be desirable and advantageous to obviate prior art shortcomings and to provide an improved method and device which the danger of collisions can be recognized more reliably than previously.

SUMMARY OF THE INVENTION

According to one aspect of the present invention, a method for operating a machine having a plurality of position-controlled axes, includes the steps of controlling with a control device of the machine the position-controlled axes in accordance with a part program while the control device processes a system program, moving an end effector under position control along a track defined by the part program via at least one intermediate element relative to a base body of the machine, checking, while processing the system program and before control of the position-controlled axes, by way of a parameterized model of the machine, whether the end effector is able to move along the track without collisions, receiving, before checking of the part program, initial measured values characteristic for the actual configuration of the machine, determining, before checking of the part program, parameters of the parameterized model based on the initial measured values, and parameterizing the model in accordance with the determined parameters.

According to another aspect of the present invention, a system program which, when executed by a control device, causes the control device to operate the machine in accordance with the aforedescribed method.

According to yet another aspect of the present invention, a control device programmed with the aforedescribed system program is configured to operate the machine in accordance with the aforedescribed method.

According to yet another aspect of the present invention, a machine includes the aforedescribed control device.

Thus, in accordance with the invention, the parameterizable model of the machine is parameterized in an automated manner on the basis of the actual machine. Thus it can no longer occur that the checking for absence of collisions is undertaken by means of a model which does not correspond to the real machine.

The initial measured values can be specified as required. For example the values can be optically detected by means of optical detection devices (camera system, laser scanning, . . . ). Also (slowly, for reasons of safety) the machine can be moved to predetermined positions and the associated actual position values of the position-controlled axes detected. Other methods of operation are also possible, for example the use of contact detection devices.

The parameterization of the model can relate for example to the alignment, the orientation, the dimensions of elements of the machine and in individual cases also to the presence or absence of elements of the machine. The detection of a workpiece and/or a workpiece holder is also possible.

It is possible that the model of the machine is initially completely unparameterized. It is further possible that, even though the model of the machine is initially parameterized, this parameterization will however simply be overwritten. But preferably the inventive operating method is embodied such that the control device, before it receives the initial measured values, receives initial parameterization of the model and determines specific initial parameters of the model through the initial parameterization of the model, determines differences of the initial parameters from the parameters of the model determined on the basis of the initial measured values, outputs an error message to an operator of the machine if the differences exceed a predefined limit value and otherwise parameterizes the model in accordance with the parameters determined.

In this case only a fine adjustment of the model on the basis of the initial measured values is thus allowed. Through this method of operation it can especially be avoided that an attempt is made to execute a part program which has been developed for a machine configured completely differently.

As part of the error message a correction of the parameterization can be requested from the operator of the machine for example.

The initial parameterization can be supplied to the control device separately from the part program. Preferably however the control device receives the initial parameterization of the model together with the part program. This method of operation is especially efficient.

In an especially advantageous embodiment of the present invention the control device receives operational measured values during the control of the position-controlled axes, determines modified parameters of the model on the basis of the operational measured values and parameterizes the model in accordance with the modified parameters. Furthermore the control device checks once again in this case, by processing the system program before a continuation of the control of the position-controlled axes by means of the model of the machine, whether the movement of the end effector along the track as defined by the part program is possible without collisions. This enables the probability of collisions to be reduced should the configuration of the machine have changed over the course of time. The checking for absence of collisions in this case—naturally—includes not only the check as to whether the end effector itself remains collision-free, but also the check as to whether other elements moved during the movement of the end effector remain collision-free, for example intermediate elements via which the end effector is moved.

For example the part program can be executed repeatedly and the check can be made between the individual execution processes. The operational measured values can be detected during the individual execution processes or between the execution processes. For example corresponding operational measured values can be detected and evaluated between the individual execution processes with the initial measured values. Furthermore, should a collision unexpectedly still occur, the model can be corrected on the basis of the collision data.

As already mentioned, it is possible for the control device to execute the part program repeatedly. In this case a workpiece is worked as a rule by means of the end effector as part of the respective execution. The working can be a material-removal (for example milling) or other type of working. Preferably the control device controls measurement devices of the machine before the respective working of the respective workpiece and detects thereby actual dimensions of the respective workpiece. In this case it is possible for the control device to check before the execution of the part program in each case whether the movement of the end effector along the track as defined by the part program is possible without collisions in relation to the respective workpiece. As part of this check—naturally—the actual dimensions of the respective workpiece are taken into account as well.

In an especially advantageous embodiment of the present invention the control device determines pairs of elements of the machine on the basis of the model of the machine and exclusively checks the pairs of elements for absence of collisions within the framework of the checking for absence of collisions. This method of operation enables the effort which is required for checking for absence of collisions to be minimized.

Preferably the control device, during the control of the position-controlled axes, receives loads of the position-controlled axes and/or loads of speed-controlled axes, compares the received loads with load limits and determines on the basis of the comparison whether a collision has occurred.

In this way an especially simple and reliable way of detecting collisions is possible. The load limits can be dependent on location and time. They can for example be determined by means of a physical model of the machine and of the working process. They are calculated in advance either in the simulation or in the control on the basis of the model.

In a similar way it is possible for the control device, during the control of the position-controlled axes, to receive loads of the position-controlled axes and/or loads of the speed-controlled axes, to compare the received loads with load thresholds and, on the basis of the comparison, to determine whether the end effector is engaging with a workpiece. The load thresholds in this case lie below the load limits. The load thresholds—in a similar way to the load limits—can be dependent on location and time.

Preferably the part program contains information about the sections of the track to be traversed by the end effector in which the end effector is to be located in engagement with a workpiece. In the case of checking for collisions on the basis of a comparison with the load limits, the load limits can be defined in this case for example as a function of whether the end effector is engaging with the workpiece or not. In the case of comparison with the load thresholds the part program can be checked for plausibility or the workpiece for correctness.

Preferably the control unit, during control of the position-controlled axes, logs a sequence of target position values of the position-controlled axes and/or a sequence of actual position values of the position-controlled axes, so that at any point in time, at least for a predetermined period, the most recent target position values and/or actual position values of the position-controlled axes are available. In this case, especially in the event of a collision, how the collision occurred can be reconstructed retrospectively in a simple manner.

In the case of logging it is also possible for the control device to make ongoing checks during control of the position-controlled axes as to whether a collision is occurring and, in the event of a collision, to control the position-controlled axes inversely in accordance with the logged sequence of target position values and/or actual position values. This means that the logging especially offers the advantage of moving the end effector back on precisely the same track on which it was moved into the collision. As an alternative it is possible for the control device, in the event of a collision, to determine on the basis of the model a direction and/or orientation of the end effector in the three-dimensional geometrical space in which the greatest free space is to be expected and to move the end effector in this direction and/or orientation.

In the event of a collision it is further of advantage for the control device to open a clamping mechanism of the end effector and/or a workpiece holder for holding a workpiece. This enables tensions to be released in a simple manner and any damage to be minimized. Rectifying a collision is also possible more easily.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
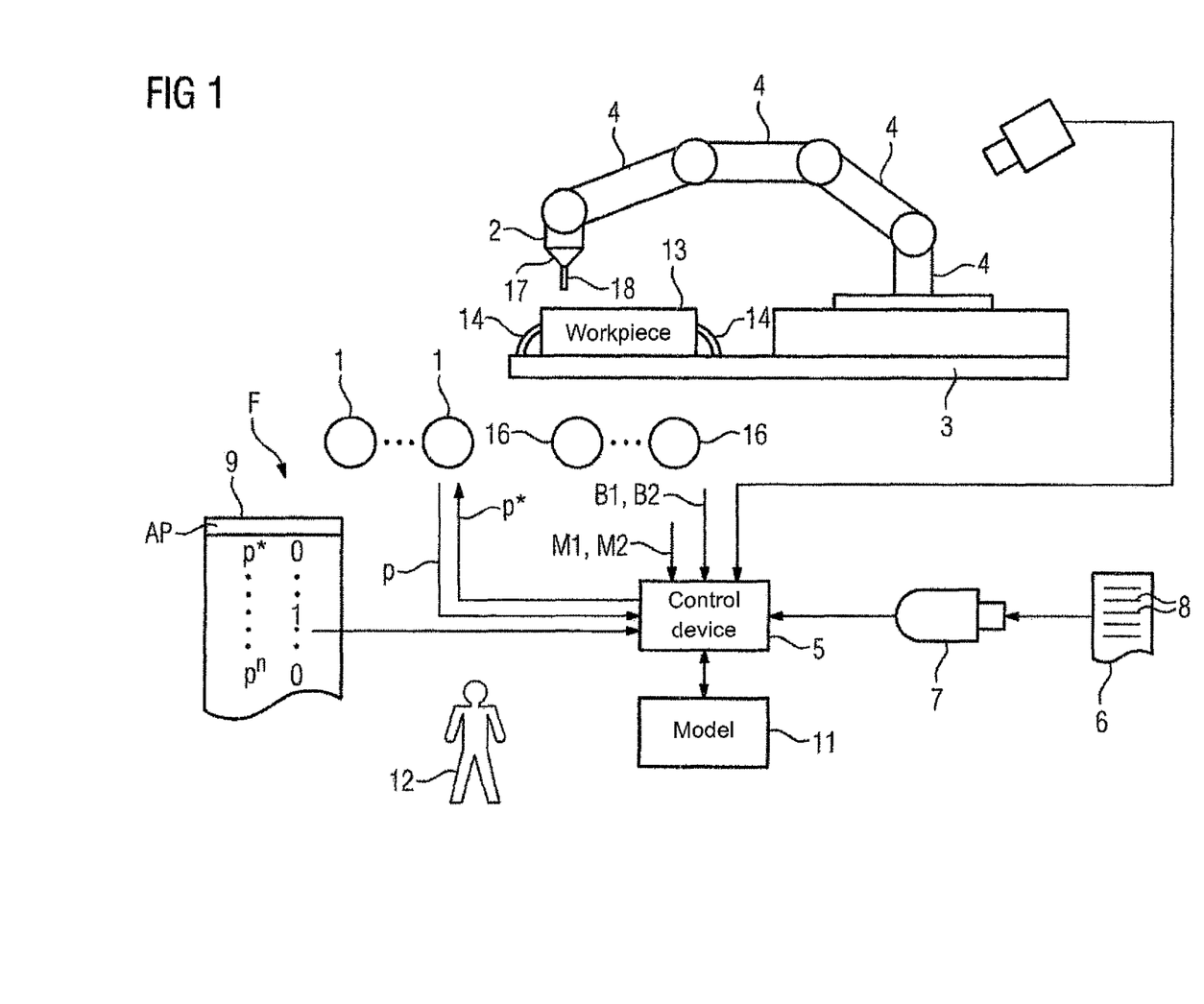
FIG. 1 shows a machine with position-controlled axes according to the present invention.

Turning now to the drawing, and in particular to FIG. 1, there is shown a machine with a plurality of position-controlled axes 1. Through corresponding control of the position-controlled axes 1 an end effector 2 (for example a workpiece holder) is able to be moved relative to a base body 3 of the machine under position control. The end effector 2 is moved via at least one intermediate element 4, mostly in accordance with the diagram in FIG. 1, via a plurality of intermediate elements 4.

The machine also has a control device 5. The control device 5 is embodied as a software-programmable control, for example as a numerical control (CNC) or as a motion control (MC). The control device 5 is programmed with a system program 6. The system program 6 can be supplied to the control device 5 via a data medium 7, on which the system program 6 is stored in machine-readable form for example. In particular the system program 6 can be stored on the data medium 7 in electronic form. The data medium 7 is shown in FIG. 1 as a USB memory stick. However this form is only shown purely by way of example.

The system program 6 comprises machine code 8. The machine code 8 is able to be processed by the control device 5. The effect of the processing of the machine code 8 by the control device 5 is that the control device 5 operates the machine in accordance with an operating method, which will be explained in greater detail below in conjunction with FIG. 2.

Figure 2:
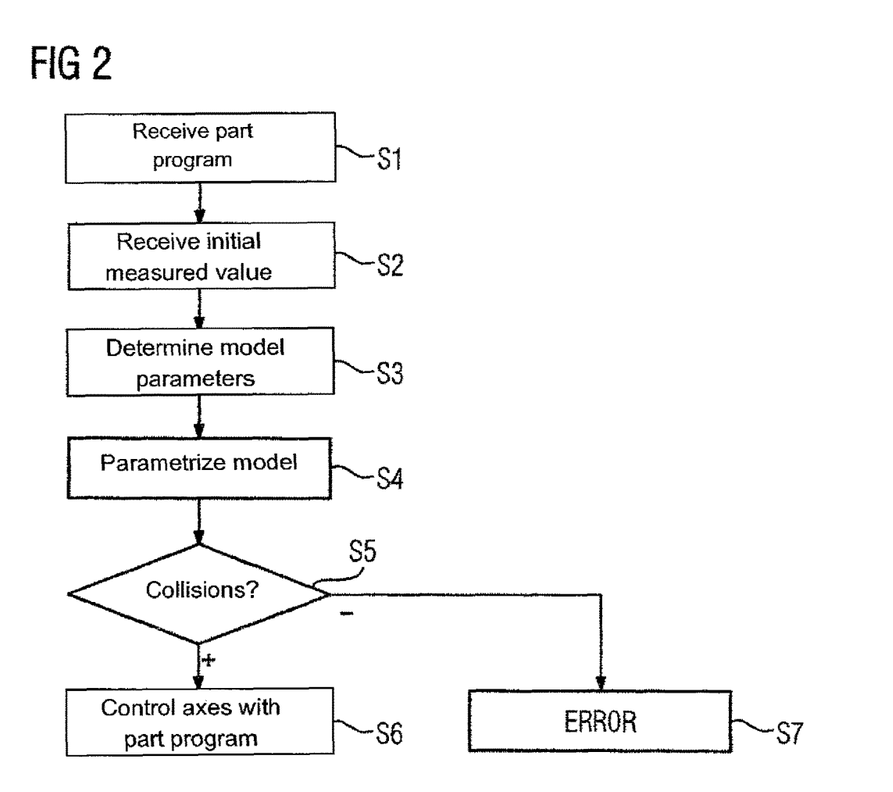
FIG. 2 shows a flow diagram.
Figure 3:
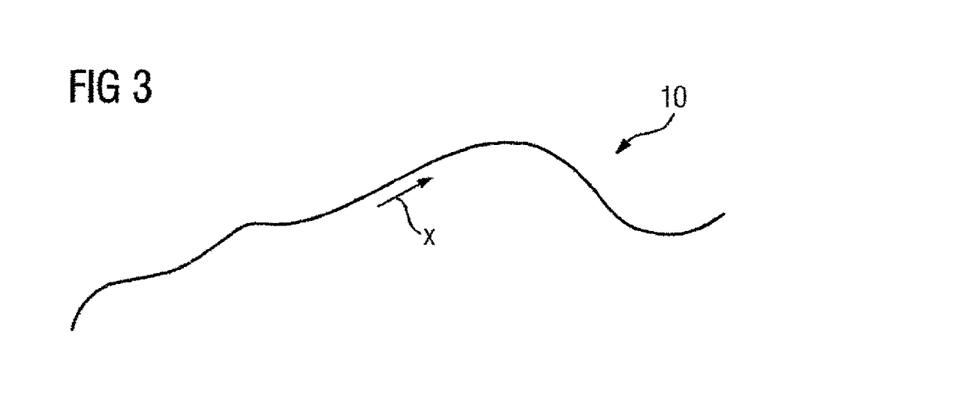
FIG. 3 shows a track to be traversed by an end effector.

In accordance with FIG. 2 the control device 5, in a step S1, receives a part program 9. The part program 9 defines (see FIG. 3) a track 10 along which the end effector 2 is to be moved in a direction of movement x. For this purpose the part program 9 explicitly or implicitly contains a sequence of target position values p* for the position-controlled axes 1, which are output one after the other to the corresponding position-controlled axes 1. The space for which the track 10 is defined has its own dimension in each case for each position-controlled axis 1. The space can, but does not have to, correspond to the three-dimensional geometrical space. The target position values p* define for each point in time a position and an orientation of the end effector 2 in the three-dimensional geometrical space.

A model 11 (see FIG. 1), which models the machine from its type, is also known to the control device 5. In a step S2 the control device 5 receives initial measured values M1. The initial measured values M1 are characteristic of an actual configuration the machine. For example on the basis of the initial measured values M1, actual lengths or other dimensions of the intermediate elements 4 or the position of motion links between intermediate elements 4 can be determined.

The model 11 is parameterizable. The parameterization of the model 11 serves to adapt the model 11 to the actual machine 1. In a step S3 the control device 5 therefore determines, on the basis of the initial measured values M1, parameters P of the model 11. In a step S4 the control device 5 then parameterizes the model 11 according to the determined parameters P.

After the parameterization of the model 11 the control device 5, in a step S5, in a known way, checks whether the movement of the end effector 2 along the track 10 defined by the part program 9 is possible without collisions. The check on absence of collisions not only includes checking whether the end effector 2 itself is free from collisions, but also checking whether for example the intermediate elements 4 remain free from collisions with one another and/or in relation to the base body 3. The control device 5 thus simulates step-by-step in step S5 the effects which would be produced by outputting the sequence of target position values p* to the position-controlled axes 1.

If no collision was detected in step S5, the control device 5 moves to a step S6. In step S6 the control device 5 controls the position-controlled axes 1 in accordance with the part program 9. It thus outputs the sequence of target position values p* one after another to the position-controlled axes 1. For the control of the position-controlled axes 1 the end effector 2 is moved via the intermediate element 4 or the intermediate elements 4 along the track 10 under position control.

If on the other hand a collision was detected in step S5, the control device 5 moves to a step S7. In step S7 the control device 5 performs error handling. In particular, in step S7, the control device 5 can suppress the processing of part program 9 and instead output an error message to an operator 12 of the machine.

It is possible for the part program 9 to be completely checked by the control device 5 in advance before target position values p* are output to the position-controlled axes 1 for the first time. As an alternative it is possible to check the part program 9 section-by-section in step S5 and, during the output of the checked section of the part program 9 (step S6), to already be checking the next section of part program 9.

It is possible that the model 11 is parameterized by the control device 5 as part of the step S4 from an undefined state. Preferably however the control device 5 in accordance with FIG. 4 initially receives an initial parameterization AP of the model 11 in a step S11. In this case the control device 5 determines initial parameters PA as part of a step S12. Before the step S4 is carried out, the control device 5 further determines in this case, in a, step S13, differences D between the initial parameters PA and the parameters P, which the control device 5 has determined in step S3 on the basis of the initial measured values M1. In a step S14 the control device 5 further checks whether the differences D exceed a predetermined threshold value GW. If they do, the control device 5 goes to a step S15. In step S15 the control device 5 outputs an error message to the operator 12. Otherwise, i.e. if the differences D do not exceed the threshold value GW, the control device 5 moves to step S4.

The initial parameterization AP can be received by the control device 5 at any given point in time, provided the point in time lies before the checking of the part program 9 for absence of collisions. Preferably however the control device 5, as shown in FIG. 4, receives the initial parameterization AP together with the part program 9.

Figure 4:
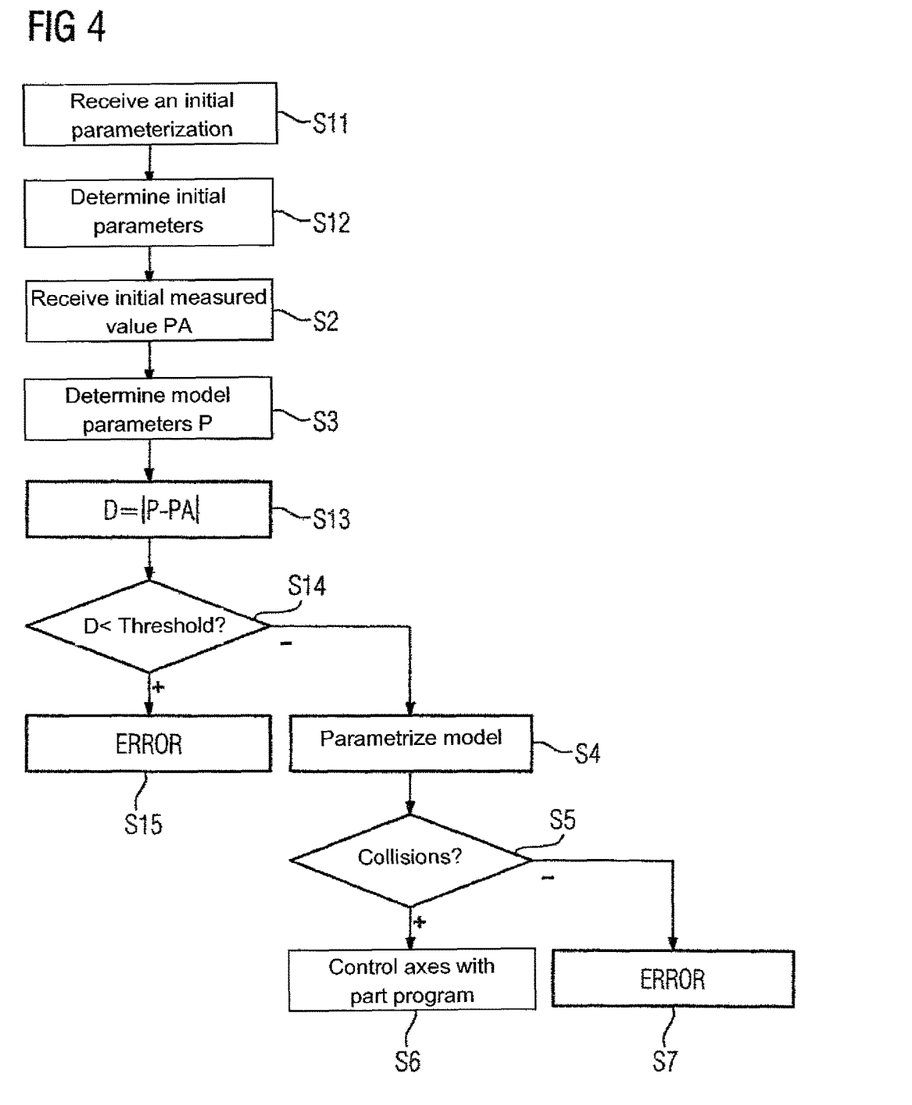
FIGS. 4 to 10 show flow diagrams.
Figure 5:
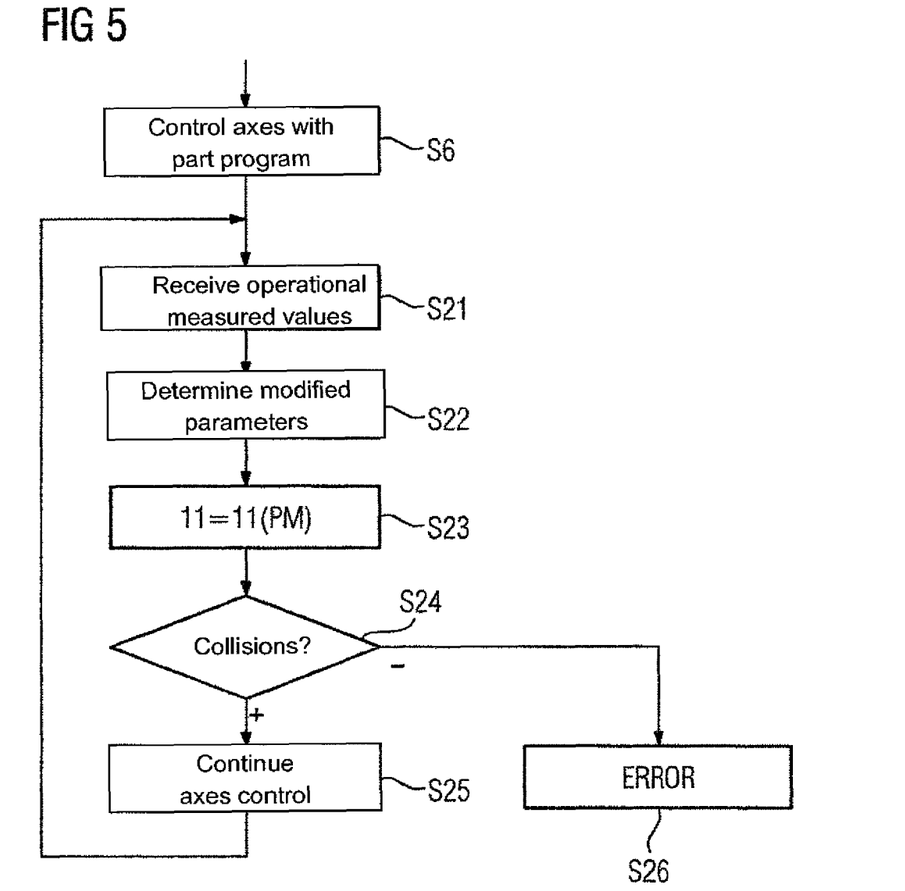

FIG. 5 shows a possible embodiment of step S6 from FIG. 2 or from FIG. 4. In accordance with FIG. 4 the inventive operating method can be modified such that the control device 5, in a step S21, receives operational measured values M2 during the control of the position-controlled axes. In this case the control device 5 preferably determines modified parameters PM of the model 11 in a step S22 on the basis of the operational measured values M2. Furthermore in this case the control device 5, in a step S23, parameterizes the model 11 in accordance with the modified parameters PM. Furthermore the control device 5 in this case, in a step S24, again determines before continuation of the control of the position-controlled axes 1, by means of the model 11 of the machine, whether the movement of the end effector along the track 10 is possible without collisions. Depending on the result of the check, either the control of the position-controlled axes 1 is continued in a step S25 or an error message is output to the operator 12 in a step S26. The method operation of FIG. 5 is especially sensible if the program 9 will be executed repeatedly. In this case the steps S21 to S24 can each be executed for example between two executions of the part program 9.

Figure 6:
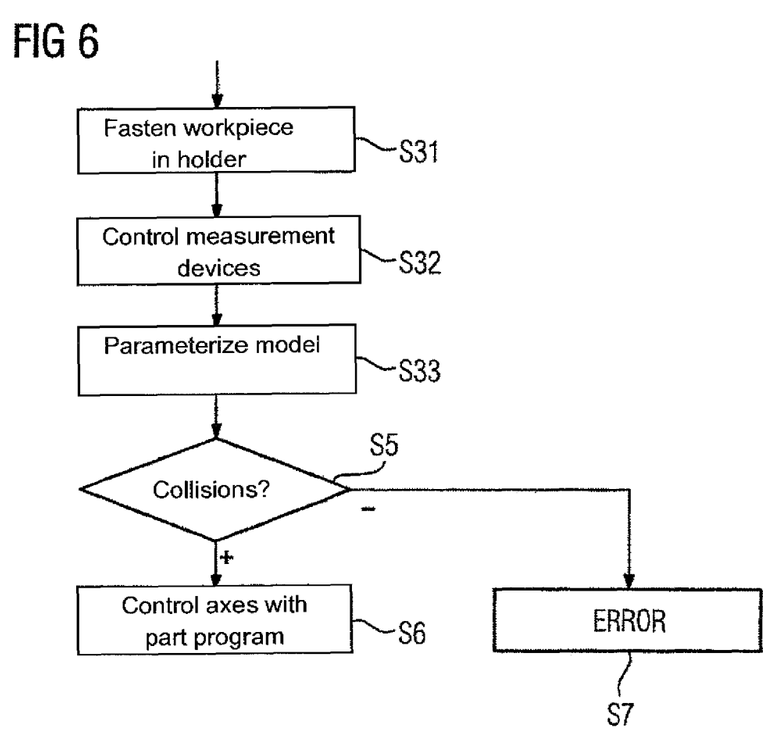

Often a workpiece 13 (see FIG. 1) will be worked by the execution of the part program 9. The working can consist of working to remove material, for example milling. However other working processes are also possible. In the case of working a workpiece 13 the part program 9 is mostly repeatedly executed, wherein another workpiece 13 is worked in each case. In this case the method of operation of FIG. 2 is preferably further embodied as follows:

In accordance with FIG. 6, in a step S31, the workpiece 13 is initially fastened in a workpiece holder 14 (see FIG. 1). It is possible for the execution of step S31 to be automated by the control device 5. As an alternative it is possible for the step S31 to be executed by the operator 12 (with or without motorized aids). Then the control device 5, in a step S32, controls measurement devices 15 of the machine. The measurement devices 15 are represented in FIG. 1 as a camera system. However other embodiments are also possible. As a result of the control of the measurement devices 15, the control device 5 detects actual dimensions A of the respective workpiece 13. In a step S33 the control device 5 parameterizes the model 11 on the basis of the parameters P (or PM) and the detected dimensions A. Then the control device 5 checks, in step S5, whether the movement of the end effector 2 along the track 10 is possible without collisions in respect of the workpiece 13. If working is possible, the control device 5 moves to step S6. If not, the control device 15 moves to step S7 in that it outputs a corresponding error message to the operator 12.

The last-mentioned embodiment has been explained above, starting from the method of operation according to FIG. 2. It is however readily applicable to the embodiment according to FIG. 4 or according to FIG. 5.

As a rule the machine consists of a plurality of elements, of which one part is able to be moved and another part is fixed. Examples of such elements are the base body 3, the intermediate elements 4, the end effector 2, a spindle, the workpiece 13, the workpiece holder 14 and more besides. In the model 11 of the machine the individual elements will often be modeled by simple geometrical bodies such as cylinders, cubes, spheres and the like for example. Theoretically it is conceivable, for checking the absence of collisions, to always check all elements in pairs for absence of collisions. Preferably however the control device 5 determines pairs of elements on the basis of the model 11 of the machine. Exclusively these pairs are checked for absence of collisions by the control device 5 as part of step S5 for example. The determination of the pairs is known to person skilled in the art and therefore does not have to be explained in greater detail.

The step S6 of FIG. 2, FIG. 4 and FIG. 6 is preferably embodied as will be explained below in conjunction with FIG.

Figure 7:
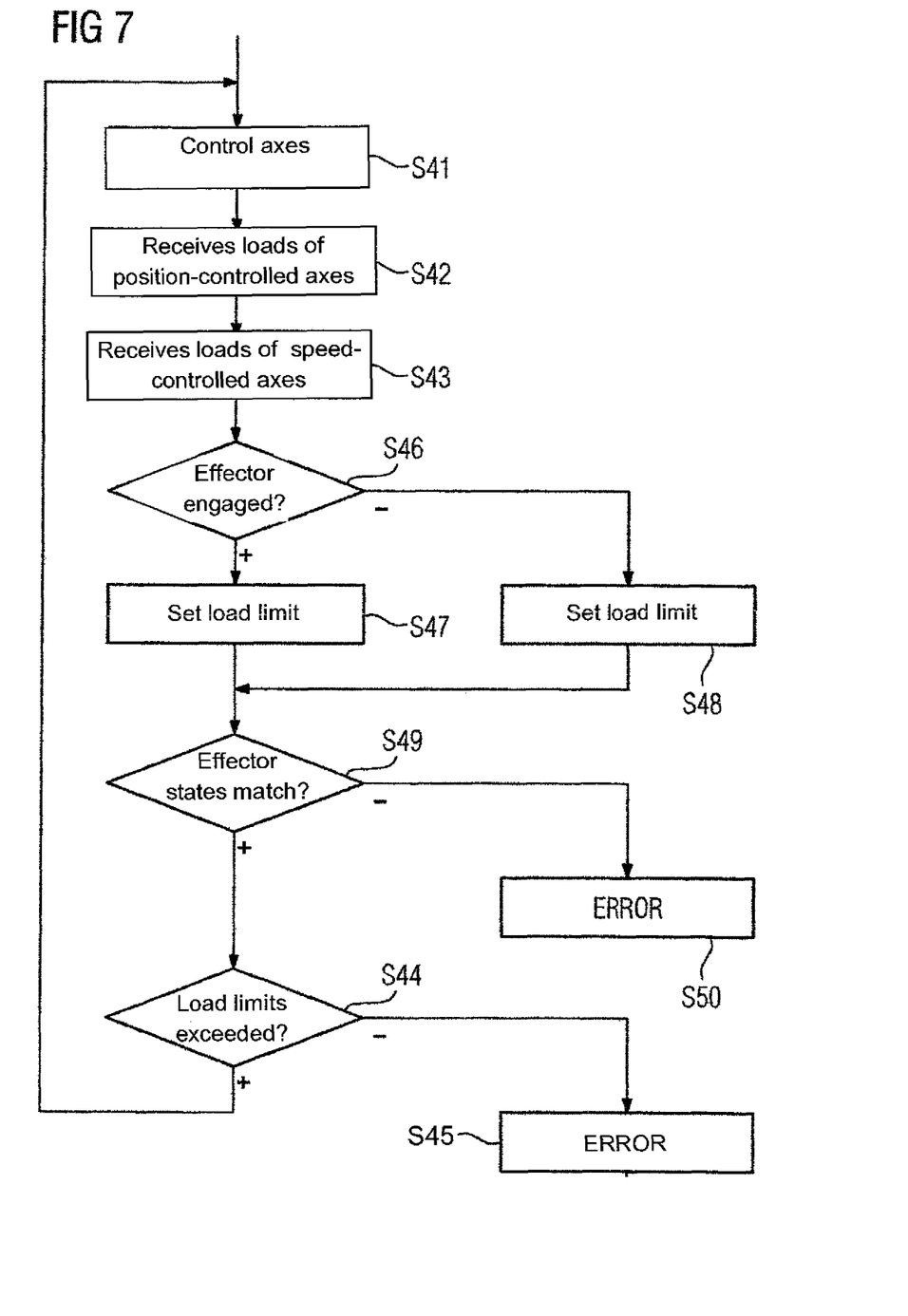

In accordance with FIG. 7 the control device 5, as part of a step S41, controls the position-controlled axes 1. Simultaneously with this action, the control device 5, in a step S42, receives loads B1 of the position controlled axes 1 (for example the motor currents). As an alternative or in addition to the loads B1 of the position-controlled axes 1 the control device 5, in a step S43, can receive loads B2 of speed-controlled axes 16. The control device 5 compares the loads B1, B2 in a step S44 with load limits BG. If the load limits BG are exceeded, this is a symptom of a collision. In this case the control device 5 moves to a step S45, in which it executes an error measure. Otherwise the control device 5 returns to step S41, so that the further processing of the part program 9 is continued. The load limits BG can be defined individually for the respective position-controlled or speed-controlled axis 1, 16. They can also depend on other circumstances. They can especially depend dynamically on the location and or the velocity with which the end effector 2 and possibly intermediate elements 4 will be moved. The load limits BG can if necessary be defined as well within the part program 9.

As an alternative or in addition to the comparison of the loads B1, B2 with the load limits BG, it is possible for the control device 5 to compare the received loads B1, B2 in a step S46 with load thresholds BS. In this case the control device 5 can determine on the basis of step S46 whether the end effector 2 is in engagement with the workpiece 13 being worked in each case. The load thresholds BS—like the load limits BG—can be defined individually for the respective position-controlled or speed-controlled axis 1, 16. They can further depend on other circumstances. Depending on whether the end effector 2 is in engagement not, in steps S47 and S48 for example the load limits BG can be set accordingly. The load thresholds BS—like the load limits BG—can depend dynamically on the location and/or the speed with which the end effector 2 and possibly intermediate elements 4 are moved. If necessary they can also be defined as part of the part program 9.

Preferably the part program 9 contains information about the sections of the track 10 in which the end effector 2 is to be in engagement with the workpiece 13. For example within the part program 9 (see FIG. 1) each group of target position values p* can be assigned a flag F. Depending on whether the flag F has the value 1 or the value 0, the end effector 2 is to be in engagement with the workpiece 13 or not. In this case especially the control device 15 can determine in a step S49 whether—in relation to the question of engagement or non-engagement—the required state of the end effector 2 matches the actual state of the end effector 2. If necessary, in a step S50 the program can move to error handling.

In an especially advantageous embodiment (see FIG. 8) the control device 5 logs during the control of the position-controlled axes 1, in a step S51, in accordance with the output order, a sequence of target position values p*. It is possible to always only add to the log so that as time progresses, an ever-longer log arises. As an alternative outdated parts of the log can be erased again or overwritten.

Figure 8:
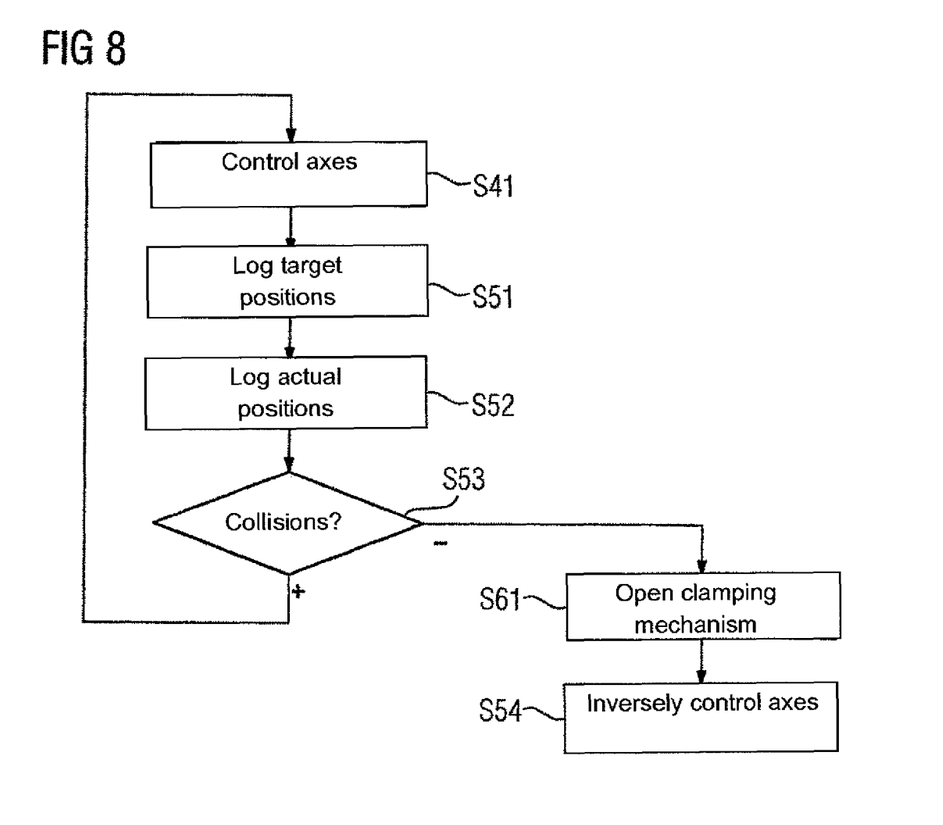

Regardless of whether one method of operation or the other is adopted, these methods of operation mean that at any given point in time for a predetermined period of time, the most recent target position values p* of the position controlled axes 1 are available. As an alternative or in addition, in a step S52, a similar method of operation can be adopted for the actual position values p.

As already mentioned, the control device 5—for example in a step S53—continuously checks during the control of the position-controlled axes 1 whether a collision is occurring. The step S53 essentially corresponds to the step S44 of FIG. 7. If a collision occurs it is therefore possible that the control device 5, after detecting a collision in a step S54, inversely controls the position-controlled axes 1 in accordance with the logged sequence of target position values p* and/or actual position values p. The corresponding values p, p* will thus be output in this case in the reverse order to the position-controlled axes 1. Regardless of whether the collision can be rectified again in a simple manner, a possible way back is thus available in any event, namely on exactly the same track 10 as previously, but with the inverse direction of movement.

Traversing the track 10 with inverse direction of movement is always possible. In some cases however it can be easier, in the event of a collision, for the control device 15 in accordance with the diagram shown in FIG. 9, to determine in a step S56, on the basis of the model 11 in the three-dimensional geometrical space, a direction and/or orientation of the end effector 2 in which the greatest free space is to be expected. In this case the control device 5 can move the end effector 2 in a step S57 in this direction and/or orientation.

Figure 9:
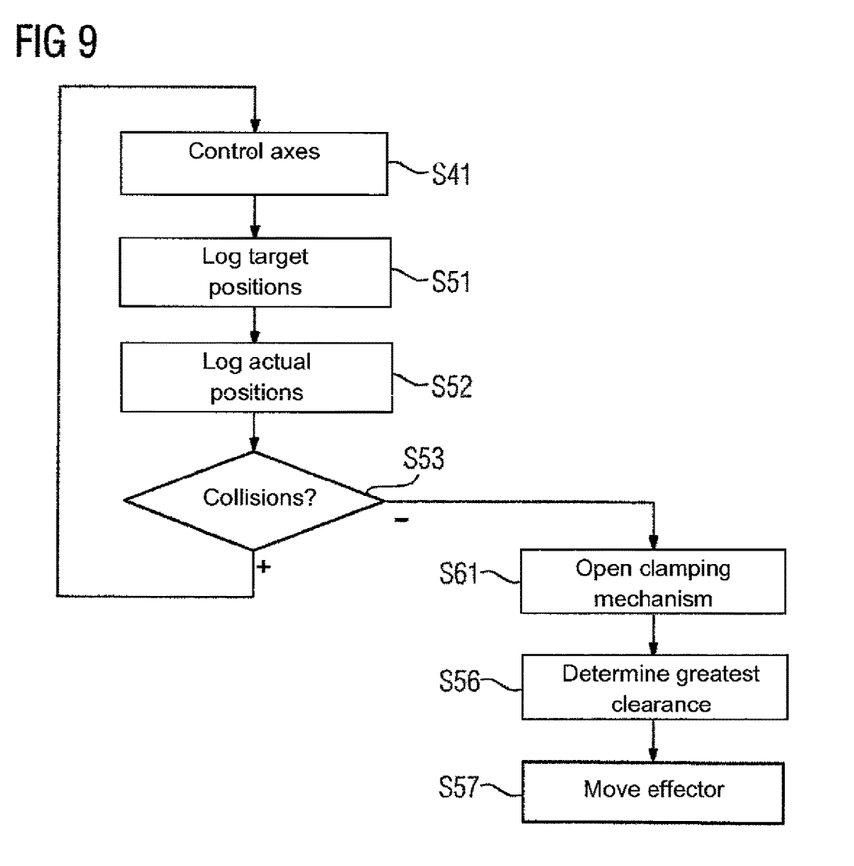

It is even possible to combine the method of operation of FIG. 8 and FIG. 9 with one another. This is explained below in conjunction with FIG. 10.

Figure 10:
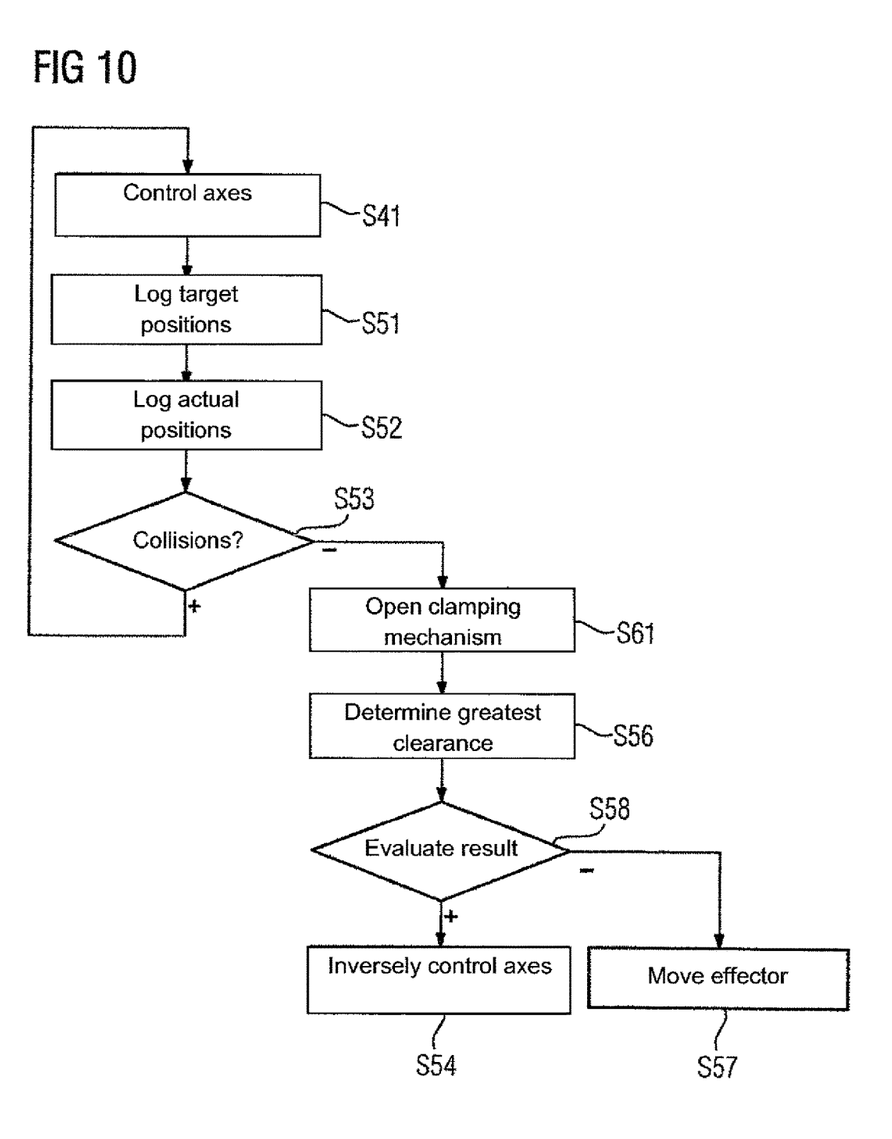

In accordance with FIG. 10, the step S56 is followed by a step S58. In step S58 the control device 5 performs an evaluation of the result of step S56. Depending on the evaluation, the control device 5 then moves to step S57 or to step S54.

In the event of a collision—this applies equally to the embodiments of FIG. 7 and of FIGS. 8 to 10—the control device 15 further preferably in a step S61, opens a clamping mechanism 17 (see FIG. 1) of the end effector 2 and/or the workpiece holder 14. This makes it possible to create additional movement options which are not possible as a part of the normal working of the workpiece 13. This is because, as part of the normal working of the workpiece 13, the workpiece 13 must be held firmly in the workpiece holder 14 and a tool 18 must further be held firmly in the chuck 17. Furthermore the tool 18 is generally located engaged with the workpiece 13. This mandatory condition, namely that the tool 18 is engaging with the workpiece 13, can be canceled out by opening the clamping mechanism 17 and/or the workpiece holder 14. By creating these additional movement options, on the one hand any damage can be minimized and on the other hand the resolution of the collision which has occurred can be facilitated.

The present invention has many advantages. In particular the reliability with which collisions can be recognized in advance can be enhanced in a simple manner. Furthermore collisions which still occur despite this can be resolved again in a reliable way. Any damage still occurring can be minimized.

In summary the present invention thus deals with the following subject matter:

A control device 5 of a machine with a plurality of position-controlled axes 1 controls the position-controlled axes 1 in accordance with a part program 9 by processing a system program 6. Through the control of the position-controlled axes 1 an end effector 2 is moved along a track 10 defined by the part program 9 via at least one intermediate element 4 relative to a base body 3 of the machine under position control. The control device 5 checks while processing the system program 6 before the control of the position-controlled axes 1 by means of a parameterizable model 11 of the machine whether the movement of the end effector 2 along the track 10 as defined by the part program 9 is possible without collisions. Before the checking of the part program 9, the control device 5 receives initial measured values M1 which are characteristic of an actual configuration of the machine, determines, on the basis of the initial measured values M1, parameters P of the model 11 and parameterizes the model 11 in accordance with the determined parameters P.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for operating a machine with a plurality of position-controlled axes, comprising:

controlling with a control device of the machine the position-controlled axes in accordance with a part program while the control device processes a system program, under control of the control device, moving an end effector under position control along a track defined by the part program via at least one intermediate element relative to a base body of the machine, checking with the control device, while processing the system program and before control of the position-controlled axes, by way of a parameterized model of the machine, whether the end effector is able to move along the track without collisions, receiving with the control device, before checking of the part program, initial measured values characteristic for the actual configuration of the machine, determining with the control device, before checking of the part program, parameters of the parameterized model based on the initial measured values, parameterizing the model with the control device in accordance with the determined parameters, and in the event of a collision, determines based on the model at least one of a direction and orientation of the end effector in three-dimensional geometrical space, in which the largest clearance is to be expected.

2. The method of claim 1, wherein the control device is configured to before receiving the initial measured values, receive an initial parameterization of the model and determine specific initial parameters of the model based on the initial parameterization of the model, determine differences between the initial parameters and the parameters determined by way of the initial measured values of the model, and output an error message to an operator of the machine, when the differences exceed a predetermined limit value, and otherwise parameterize the model in accordance with the determined parameters.

3. The method of claim 2, wherein the control device receives the initial parameterization of the model together with the part program.

4. The method of claim 1, wherein the control device, while controlling the position-controlled axes, receives operational measured values; determines based on the operational measured values modified parameters of the model and parameterizes the model in accordance with the modified parameters and wherein the control device, while executing the system program and before continuing controlling the position-controlled axes, checks again with the model of the machine whether the end effector is able to move along the track defined by the part program without collisions.

5. The method of claim 1, wherein the control device executes the part program repeatedly, wherein the end effector machines a respective workpiece during a respective execution of the part program, wherein before the respective workpiece is machined, the control device controls measurement devices of the machine to detect actual dimensions of the respective workpiece, and wherein the control device checks, before the respective execution of the part program, whether the end effector is able to move along the track in relation to the respective workpiece without collisions.

6. The method of claim 1, wherein the control device determines pairs of elements of the machine based on the model of the machine and exclusively checks the pairs of elements for absence of collisions, when checking for absence of collisions.

7. The method of claim 1, wherein the control device, while controlling the position-controlled axes,
receives loads of the position-controlled axes or loads of speed-controlled axes,
compares the received loads with load limits, and
determines based on the comparison whether a collision has occurred.

8. The method of claim 1, wherein the control device, while controlling the position-controlled axes,
receives loads of the position controlled axes or loads of speed-controlled axes,
compares the received loads with load thresholds, and
determines based on the comparison whether the end effector is in engagement with a workpiece.

9. The method of claim 8, wherein the part program contains information about sections of the track to be traversed by the end effector in which the end effector is in engagement with a workpiece.

10. The method of claim 1, wherein the control device, while controlling the position-controlled axes, logs a sequence of target position values or of actual position values, or both, of the position-controlled axes, so that at any point in time, at least for a predetermined period of time, the most recent target position values or actual position values are available.

11. The method of claim 10, wherein the control device, while controlling the position-controlled axes,
continuously checks whether a collision is occurring, and
in the event of a collision, inversely controls the position-controlled axes in accordance with the logged sequence of target position values or actual position values.

12. The method of claim 1, wherein the control device, while controlling the position-controlled axes,
continuously checks whether a collision is occurring, and
moves the end effector in this direction or with this orientation.

13. The method of claim 1, wherein the control device, while controlling the position-controlled axes,
continuously checks whether a collision is occurring, and
in the event of a collision, opens at least one of a clamping mechanism of the end effector and a workpiece holder for holding the workpiece.

14. A system program, stored on a non-transitory medium and comprising machine code which, when loaded into a memory of a control device for a machine having a plurality of position-controlled axes and executed by the control device, causes the control device to operate the machine by
controlling with the control device of the machine the position-controlled axes in accordance with a part program while the control device processes a system program,
under control of the control device, moving an end effector under position control along a track defined by the part program via at least one intermediate element relative to a base body of the machine,
checking with the control device, while processing the system program and before control of the position-controlled axes, by way of a parameterized model of the machine, whether the end effector is able to move along the track without collisions,
receiving with the control device, before checking of the part program, initial measured values characteristic for the actual configuration of the machine,
determining with the control device, before checking of the part program, parameters of the parameterized model based on the initial measured values,
parameterizing the model with the control device in accordance with the determined parameters, and
in the event of a collision, determining based on the model at least one of a direction and orientation of the end effector in three-dimensional geometrical space, in which the largest clearance is to be expected.

15. The system program of claim 14, wherein the system program is stored on the non-transitory medium in machine-readable form.

16. A control device for a machine having a plurality of position-controlled axes, wherein the control device is programmed with a system program, stored on a non-transitory medium and comprising machine code which, when loaded into a memory of a control device for a machine having a plurality of position-controlled axes and executed by the control device, causes the control device to operate the machine by
controlling with the control device of the machine the position-controlled axes in accordance with a part program while the control device processes a system program,
under control of the control device, moving an end effector under position control along a track defined by the part program via at least one intermediate element relative to a base body of the machine,
checking with the control device, while processing the system program and before control of the position-controlled axes, by way of a parameterized model of the machine, whether the end effector is able to move along the track without collisions, receiving with the control device, before checking of the part program, initial measured values characteristic for the actual configuration of the machine, determining with the control device, before checking of the part program, parameters of the parameterized model based on the initial measured values, parameterizing the model with the control device in accordance with the determined parameters, and in the event of a collision, determining based on the model at least one of a direction and orientation of the end effector in three-dimensional geometrical space, in which the largest clearance is to be expected.

17. A machine, comprising:

a base body, a plurality of position-controlled axes, an end effector movable relative to the base body via at least one intermediate element, and a control device configured to operate the machine by controlling with the control device of the machine the position-controlled axes in accordance with a part program while the control device processes a system program, under control of the control device, moving an end effector under position control along a track defined by the part program via at least one intermediate element relative to a base body of the machine, checking with the control device, while processing the system program and before control of the position-controlled axes, by way of a parameterized model of the machine, whether the end effector is able to move along the track without collisions, receiving with the control device, before checking of the part program, initial measured values characteristic for the actual configuration of the machine, determining with the control device, before checking of the part program, parameters of the parameterized model based on the initial measured values, parameterizing the model with the control device in accordance with the determined parameters, and in the event of a collision, determining based on the model at least one of a direction and orientation of the end effector in three-dimensional geometrical space, in which the largest clearance is to be expected.

\* \* \* \* \*